United States Patent
Götz et al.

(10) Patent No.: US 10,530,897 B2
(45) Date of Patent: Jan. 7, 2020

(54) PROVIDING PROCESS VALUES IN A PROCESS SYSTEM HAVING A REAL-TIME REQUIREMENT

(71) Applicant: Siemens Aktiengesellschaft, München (DE)

(72) Inventors: Franz-Josef Götz, Heideck (DE); Christian Hock, Fürth (DE); Jürgen Schmitt, Fürth (DE); Frank Volkmann, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 133 days.

(21) Appl. No.: 15/753,408

(22) PCT Filed: Aug. 20, 2015

(86) PCT No.: PCT/EP2015/069178
§ 371 (c)(1),
(2) Date: Feb. 19, 2018

(87) PCT Pub. No.: WO2017/028932
PCT Pub. Date: Feb. 23, 2017

(65) Prior Publication Data
US 2018/0248980 A1  Aug. 30, 2018

(51) Int. Cl.
*H04L 29/06* (2006.01)
*G05B 19/418* (2006.01)
(Continued)

(52) U.S. Cl.
CPC .......... *H04L 67/42* (2013.01); *G05B 19/4185* (2013.01); *G06F 9/542* (2013.01);
(Continued)

(58) Field of Classification Search
CPC combination set(s) only.
See application file for complete search history.

(56) References Cited

U.S. PATENT DOCUMENTS

2004/0114582 A1   6/2004  Götz
2004/0131066 A1   7/2004  Götz
(Continued)

FOREIGN PATENT DOCUMENTS

| EP | 1768349 A1 | 3/2007 |
|---|---|---|
| WO | WO 0213482 A1 | 2/2002 |
| WO | WO 2013178270 A1 | 12/2013 |

OTHER PUBLICATIONS

"Media Access Contra I (MAC) Bridges and Virtual Bridged Local Area Networks Amendment: Stream Reservation Protocol (SRP) Enhancements and Performance Improvements; 802-IQco-d0-4"; IEEE Draft; 802-IQCC-D0-4, IEEE-SA, Piscataway, NJ USA; Bd. 802,1; Nr. d0-4; pp. 1-124; XP068089491;; 2015.
(Continued)

*Primary Examiner* — Arvin Eskandarnia
(74) *Attorney, Agent, or Firm* — Henry M. Felereisen LLC

(57) ABSTRACT

In automation-engineering installations, there is a need to exchange process information between different devices. For this, OPC Unified Architecture (OPC UA) from OPC Foundation has become established as a standard protocol. However, rather than transmit requested OPC-UA subscriptions via the conventional OPC-UA session channel, the invention sets up a separate TSN data communication by means of which that subscription information is transmitted.

9 Claims, 2 Drawing Sheets

(51) Int. Cl.
*G06F 9/54* (2006.01)
*H04L 29/08* (2006.01)

(52) U.S. Cl.
CPC .. *H04L 67/104* (2013.01); *G05B 2219/33149* (2013.01); *G05B 2219/34263* (2013.01)

(56) References Cited

U.S. PATENT DOCUMENTS

| | | |
|---|---|---|
| 2004/0230693 A1 | 11/2004 | Baus et al. |
| 2004/0230694 A1 | 11/2004 | Baus et al. |
| 2010/0017785 A1 | 1/2010 | Volkmann |
| 2010/0152867 A1 | 6/2010 | Hock et al. |
| 2016/0073443 A1 | 3/2016 | Deiretsbacher et al. |
| 2016/0197820 A1 | 7/2016 | Götz |
| 2017/0300043 A1* | 10/2017 | Deiretsbacher .... G05B 19/4186 |

OTHER PUBLICATIONS

Kehrer Stephan et al.: "A comparison of fault-tolerance concepts for IEEE 802.1 Time Sensitive Networks (TSN)"; Proceedings of the 2014 IEEE Emerging Technology and Factory Automation (ETFA); IEEE; pp. 1-8; XP032718698; DOI: 10.1109/ETFA.2014.7005200;; 2014.

Anonymous: "IEEE 802.1 Time-Sensitive Networking Task Group"; XP055264337; Gefunden im Internet: URL:http://www.ieee802.org/f/pages/tsn.htm; 2016.

PCT International Search Report and Written Opinion of International Searching Authority dated Apr. 18, 2016 corresponding to PCT international Application No. PCT/EP2015/069175 filed Aug. 20, 2015.

* cited by examiner

PROVIDING PROCESS VALUES IN A PROCESS SYSTEM HAVING A REAL-TIME REQUIREMENT

CROSS-REFERENCES TO RELATED APPLICATIONS

This application is the U.S. National Stage of International Application No. PCT1EP2015/069178, filed Aug. 20 2015, which designated the United States and has been published as International Publication No. WO 2017/028932 A1, pursuant to 35 U.S.C. 119(a)-(d).

BACKGROUND OF THE INVENTION

The invention concerns a system to control a process, for example, a manufacturing process, in which a server device determines the current process value for at least one process parameter, for example a temperature, at different transmission times and distributes it to a plurality of other devices, here referred to as client devices. The invention also includes an appropriate server device and a corresponding client device, as well as a method to operate the server device.

In automation-engineering installations, or systems in short, there is the necessity to exchange process information between different devices. For this purposes, a standard protocol, OPC Unified Architecture (OPC-UA) by the OPC Foundation has become established. (OPC-OLE for process control, OLE-object linking and embedding).

In such scenarios, it is very often the case that multiple consumers of process information (clients) are interested in the same process information, which is repeatedly transmitted from the OPC-UA Server to the different clients. In addition, OPC-UA secures this data transport by means of receipt confirmations, for example. For this purpose, OPC-UA requires that the client and server know each other. A specific peer-to-peer connection is established between the client and the server, the so-called OPC-UA session.

When operating a system, it can happen that a server device becomes overloaded due to managing connections or sessions and multiple transmissions of current process values. Here, it is then required to provide a server device that is more elaborate on a switch-technical level, being therefore more expensive to manufacture. In addition, the multiple transmissions of process values can impair communication behavior of the system, since multiple transmissions of process values block the communication of other devices.

Today, OPC-UA subscriptions are secured (TCP) 1:1 communication relations that a server has to manage. An extension of the UDP protocol is a possible solution. The User Datagram Protocol, in short UDP, is a minimal connectionless Internet protocol that belongs to the transport layer of the Internet protocol family. UDP enables applications to send datagrams in IP-based computer networks. UDP addresses the problem of the I:n relationship, however brings about new problems, for example, non-secured communication. The UDP approach also brings about new attack vulnerabilities to the network and to productive communication, for example, flooding the network with large amounts of data packets.

Thereby, the OPC-UA layer has no possibilities of influencing the network level in line with protocol.

In the case of OPC-UA, subscriptions are used to transmit data changes between the server and client, as already mentioned above: a client creates such a subscription on a server and adds elements, via which it will be informed of value changes. As soon as this subscription is successfully set up, the client is informed of value changes of the entered elements.

A client can create a plurality of subscriptions. In addition to the information about which elements it would like to be informed of, the subscription also contains information about what form or also how frequently it would like to obtain this information/updates.

In order to obtain updates, the client makes a server request, which is responded to by the server with a response as soon as a change in data occurs.

The server must manage the pending requests and send keep-alive messages to the client when no value change occurs.

If a plurality of clients want to be informed of value changes, each individual client must create their own subscription on the server and add the appropriate elements. Then, the server must send a message to each client that contains the same content.

If you would not like to invest the effort for a subscription, the client can also simply make a READ request to the server. Thereby, the server must not manage the subscription mechanism, however, it must establish a context in the case of every read access that uses the server in order to establish an assignment of variable names for the actual variable access.

For both variations (read or subscribe), a session must be established between the client and server, which is valid as long as the client is interested in the value change.

So-called "UDP multitarget subscriptions for OPC-UA" are already known. In the case of this solution, a plurality of clients can be consolidated into multicast clusters in order to minimize the burden of management and transport.

This UDP mechanism cannot however explicitly ensure any service quality and therefore can only be used in environments, in which data loss is acceptable (at least over the short term). Furthermore, the UDP protocol only works unidirectionally.

Therefore, the object of the invention is to efficiently devise an exchange of process values between devices belonging to a system.

SUMMARY OF THE INVENTION

The task is achieved by the subject matter of the independent patent claims. Further advantageous embodiments of the invention are indicated by means of the features of the dependent patent claims.

According to the invention, a method is provided, by means of which a server or a server device is operated in a system. In the case of the system, it has to do with a automation-engineering installation, which, for example, acts to manufacture a product (e.g. to manufacture a motor vehicle) or to carry out a process (such as, for example, to generate energy based on atomic power) or to control a system (for example, to control traffic lights in a city district). The process can also be arranged within an individual apparatus, for example, it can deal with the control of a robot to coordinate individual devices of the robot, for example, its sensors and actuators. A different apparatus can, for example, be a manufacturing station, for example a painting station or a bottle-filling station. A process can also provide the desired functionality within such stations. Thereby, such an apparatus and such a station preferably fall under the term "system".

The controlled process has at least one process parameter, which can change due to the sequence of the process, for example, a temperature, a pressure, a turning position, for example, a rotor or a shaft, or a speed, of a production line, for example. The server device determines a current process value respectively for at least one process parameter at different times, meaning the current temperature or the current pressure for example. In addition, the server device can, for example, have a temperature sensor or a pressure sensor or a motor control system for an electric motor or a control device for a robot.

The respective current process value of the at least one process parameter should be sent out to a plurality of client devices of the system. A client device can also be, for example, a motor control system or another actuator control system or a sensor. Thereby, each of the client devices can require from the server device the current process value for either each of the at least one process parameter or also only for a subset of it, meaning one or several. Accordingly with this, at the respective time, the server device sends the respectively determined current process value concerning each or a subset of the at least one process parameter to a plurality of client devices of the system via a data network, for example, an Ethernet or a PROFINET bus.

The server device carries the following steps out in order to efficiently organize the generated data traffic on the data network.

The server device forms a group made up of at least one process parameter that must be sent to at least one of the client devices. The server device consolidates the current process values of at least one process parameter of the group into an individual TSN telegram at a transmission time and sends the TSN telegram into the data network.

Now, a copy of this telegram is not sent to each of the devices, but the server device sends the telegram into the data network, addressed to all clients that belong to the group concerned.

The term server device is not limited to a device, which is only operated as a data source for process values. The server device for the at least one process parameter can, at the same time, in relation to at least one other process parameter, be a client device, which receives current process values concerning the at least one other process parameter from another server device.

The idea is not to transmit requested OPC-UA subscriptions via the conventional OPC-UA session channel, but to establish a separate TSN data communication, via which: the subscription information can be transmitted.

Time-Sensitive Networking (TSN) is a series of standards, on which the Time-Sensitive Networking Task Group (IEEE 802.1) works.

TSN describes advanced layer-2 mechanisms and protocols for bridges and terminal devices in order to guarantee determinism, among other things. Protocols, which already exist, are enhanced and new protocols are established (e.g. protocols for path calculation and for reservation). Determinism is a fundamental requirement for Ethernet-based networks, in order to be used on the factory floor by the automation-engineering installations (naturally, also energy, automotive).

The invention results in the advantage that computing power is saved on within the server device since the process values no longer have to be sent a number of times and the server device only has to prepare the process values a single time for a plurality of client devices accordingly. In particular, this is advantageous at the field level of a system, where a server device can be a less powerful device, for example, a sensor.

The invention also includes a device for a system to control a process, which can act as a client device accordingly. The device is designed to send out a request telegram to a server device, in which it is indicated, from which at least one process parameter, which is monitored by the server device, process values must be sent to the client device respectively. The client device sends the request telegram via a data network. Furthermore, the device is designed to send a request telegram to a server device and to receive group information via the data network from the server device. Then, via the data network, an addressed TSN telegram is received at various transmission times and at least one process value contained therein is read out of the TSN telegram.

As has already been explained, the very same device can be designed as a server device, as well as a client device, or can be operated as such.

Finally, the invention still includes a system to control a process. It has already been explained, what processes it can, for example, deal with. The system has at least one server device and a plurality of client devices according to the invention.

BRIEF DESCRIPTION OF THE DRAWINGS

An exemplary embodiment of the invention is described below with reference to the following figures.

DETAILED DESCRIPTION OF A PREFERRED EMBODIMENT

In the case of the exemplary embodiment described in the following, it has to do with a preferred embodiment of the invention. However, in the case of the exemplary embodiment, the described components of the embodiment each represent individual features of the invention that are independent of each other, which also further develop the invention independently of each other, thereby also being considered an integral component of the invention on an individual basis or in another combination than the one shown. Furthermore, other features of the invention, which have already been described, can also be added to the described embodiment.

A client requests one or a plurality of subscriptions with one or a plurality of elements (monitored items) and characteristics (e.g. publishing rate) from the server.

Figure 1:
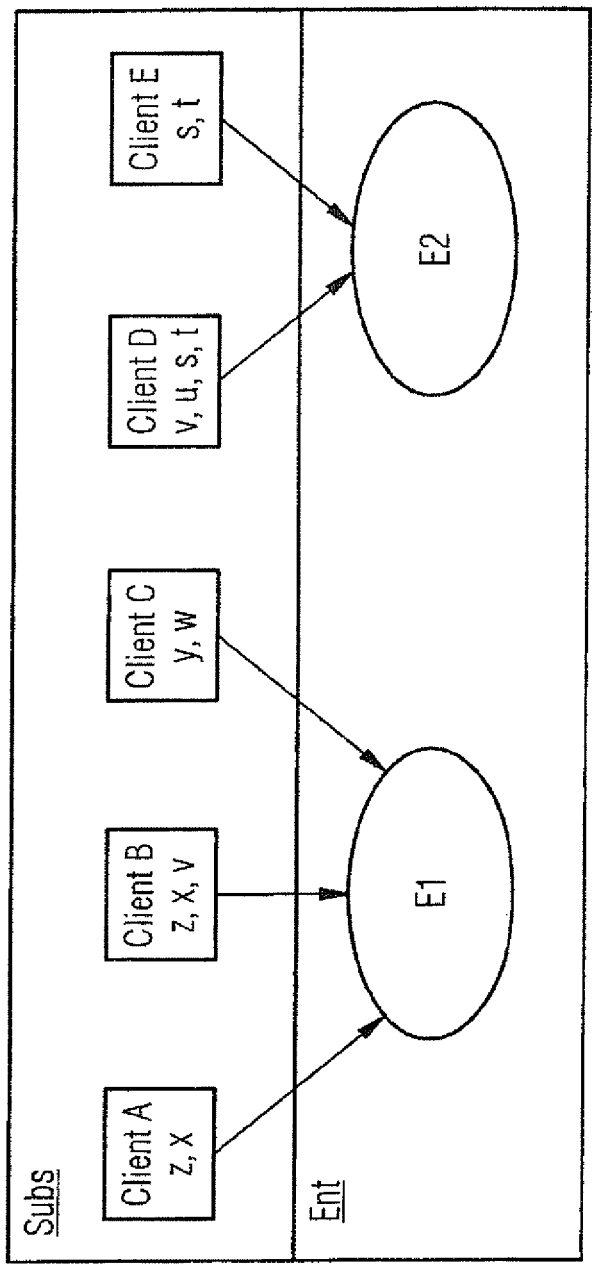
FIG. 1 a schematic representation of the information stored on the server with regard to a subscription.

In FIG. 1, five servers are indicated as an example, which request information as follows:

Client A
Items: z, y
Proxy: Redundant
Client B
Items: z, x, v
Client C
Items: y, w
Client D
Items: v, u, s, t
Client E
Items: s, t Two groups are formed from this as follows:
Entity group 1:
Client: A, B, C
Items: v, x, y, z
Proxy: Redundant
Entity group 2:
Client: D, E
Items: v, u, s, t The server itself forms (or supplements) these groups, E1, E2. These groups form the basis for the management of subscriptions in the server. One group consolidates a plurality of process parameters to be monitored v, w, x, y, z (monitored items) from potentially different clients, Client A, Client B, . . . , using the characteristics. Characteristics can, for example, be the publishing rate or the requested quality (guarantee) of the transmission etc.

Thereby, groups are not a 1:1 representation of the subscription request of an individual client, but rather an optimized consolidation/splitting of various subscription requests of various clients.

When forming groups it can be determined that no new groups are required for the new subscription. In this case, the client will only be informed which groups are relevant for it. The server also informs the network of the new communication request (TSN path extension and reservation).

Figure 2:
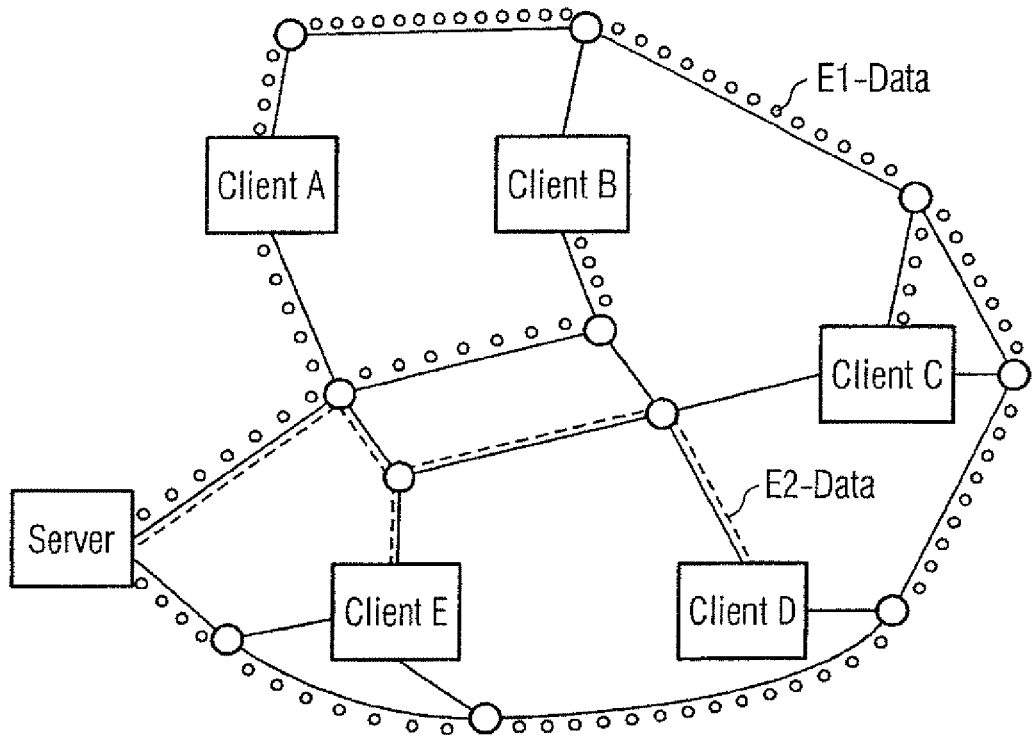
FIG. 2 an exemplary network with a server and a plurality of client devices, and FIG. 3 a flow chart for an embodiment of the method according to the invention, which can be carried out in the system of FIG. 1.

New groups are created in this step, so the server also initiates a path and a bandwidth reservation for this new entity group. The client is also addressed by the path. The client is informed of this (the new group). In FIG. 2, such a network is illustrated, which consists of a server device and five client devices, Client A etc. Data paths E1-Data and E2-Data are each reserved for both groups, E1 and E2.

The advantage of the UDP subscription is fully achieved by using TSN according to the invention in order to form an OPC-UA subscription (1:n communication), but without having the UDP disadvantages mentioned in the above.

Furthermore, OPC-UA acquires new characteristics by means of TSN, that are not possible in OPC-UA nor can they be added via the UDP mechanism:

Now, for example, it becomes possible to use media redundancy in OPC-UA without further complexity, which results in a considerable increase in availability.

Now, determinism (guaranteed latency/real-time) and loss-free transmission also exists for OPC-UA by means of the "quality of service" of TSN.

In particular, this is considered an advantage since OPC-UA does so explicitly without determinism due to the event-based communication, thereby ruling out the use in certain real-time environments.

By using the claimed method, it is possible for OPC-UA to be used in fields where use has been ruled out up until this point.

Due to the use of TSN mechanisms to form OPC-UA subscriptions, additional mechanisms to protect against attacks on OPC-UA communication from TSN are available. Calculated paths and reservation ensures that the flooding of the network cannot disturb productive communication. This does not require any other management effort in the OPC-UA client or server.

Figure 3:
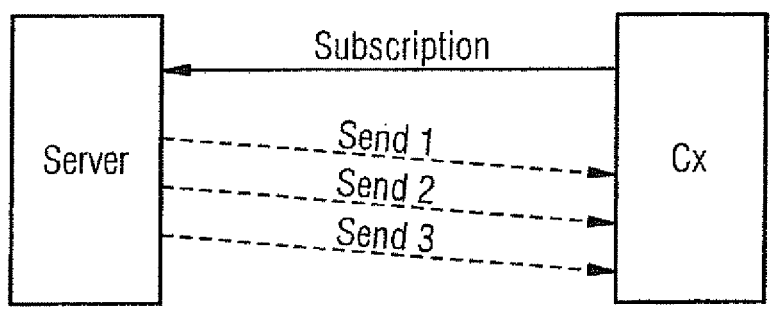

In FIG. 3, communication between client and server is still illustrated as an example; this receives the requested process values, Send1, Send2 . . . , after the subscription of the client at the server.

The invention claimed is:
1. A method for operating a server device in a system for controlling at least one process, said method comprising:

determining respective current process values for at least one process parameter of one of the processes controlled by the system at different transmission times;
sending the respective determined current process value of the at least one process parameter to a respective client device using a data network, the server device forming a group including the at least one current process parameter that must be sent to said client device, said server device consolidating said group including said current process value of the at least one process parameter into a respective TSN (Time Sensitive Network) telegram at a respective transmission time using the TSN standard; and
sending the TSN telegram into the data network for transmission via the data network to the respective client device which is adapted to read an information group that includes the current process value of the at least one process parameter from the TSN telegram.

2. The method of claim 1, further comprising the server device receiving a TSN request telegram from at least one client device in a configuration phase via a network connection during a OPC-UA (Open Platform Communications Unified Architecture) session in accordance with the OPC-UA standard.

3. The method of claim 1, wherein the request TSN telegram contains information specifying in what form or how often updated information will be provided by the server for the requested process values.

4. The method of claim 1, further comprising sending a keep-alive message from the server device when the current process value of at least one process parameter of the group has not changed in comparison to the last message, at the next transmission time.

5. The method of claim 1, further comprising forming a group for a request, said group including at least one process parameter that must be sent by the server device to at least one client device in accordance with at least one property of the request.

6. The method of claim 5, wherein the property of the request in accordance with which the group must be sent by the server device is the frequency of sending the group or the quality of service used for sending the group.

7. The method of claim 1, further comprising:
the server device receiving a request telegram from at least one client device; and
the server determining whether the request is a request for an existing group or a new group must be formed.

8. The method of claim 1, further comprising reserving an appropriate path in the data network for each group using the TSN standard.

9. A system to control a process, said system having a data network, said system comprising:
at least one server device connected to the data network, said server device using machine code that is fixed in a machine-readable medium, said machine code comprising: a) a routine determining respective current process values for at least one process parameter of one of the processes controlled by the system at different transmission times, b) a routine forming a group including the at least one current process parameter that must be sent to a respective client device, said server device consolidating said group including said current process value of the at least one process parameter into a respective TSN (Time Sensitive Network) telegram at a respective transmission time using the TSN standard, and c) a routine sending the respective TSN telegram to a respective client device using the data network; and at least one client device connected to data network, said client device being adapted to send out a request telegram to the server device, said request telegram indicating process values of at least one process parameter that must be sent to the client device, said client device being adapted to receive a TSN telegram from the server device addressed to the client device via the data network at various transmission times, said TSN telegram having information groups that include the at least one process value, said client device being adapted to read an information group that includes the at least one process value from the TSN telegram.

* * * * *